United States Patent
Kuwabara et al.

[11] Patent Number: 6,012,305
[45] Date of Patent: Jan. 11, 2000

[54] APPARATUS FOR PRODUCING AN OPTICAL FIBER POROUS GLASS PREFORM

[75] Inventors: Masahide Kuwabara; Tetsuro Wada, both of Mie; Yukio Komura, Aichi, all of Japan

[73] Assignee: The Furukawa Electric Co., Ltd., Tokyo, Japan

[21] Appl. No.: 09/035,905

[22] Filed: Mar. 6, 1998

[30] Foreign Application Priority Data

Mar. 6, 1997 [JP] Japan .................................... 9-051210

[51] Int. Cl.[7] .............................. C03B 37/02; F27B 14/18
[52] U.S. Cl. ................................. 65/502; 65/385; 65/391; 65/392; 65/413; 65/414; 65/421; 65/378; 65/485
[58] Field of Search .............................. 65/385, 391, 392, 65/413, 414, 421, 378, 485, 502

[56] References Cited

U.S. PATENT DOCUMENTS

| | | | |
|---|---|---|---|
| 4,224,046 | 9/1980 | Izawa et al. | 65/414 |
| 4,419,116 | 12/1983 | Nakahara et al. | 65/414 |
| 4,421,540 | 12/1983 | Nakahara et al. | 65/414 |
| 5,028,246 | 7/1991 | Sarkar | 65/414 |
| 5,558,692 | 9/1996 | Chervenak et al. | 65/485 |
| 5,558,693 | 9/1996 | Sarkar | 65/414 |
| 5,672,192 | 9/1997 | Fleming, Jr. | 65/391 |
| 5,676,725 | 10/1997 | Ito et al. | 65/414 |

FOREIGN PATENT DOCUMENTS

| | | |
|---|---|---|
| 62-171939 | 7/1987 | Japan . |
| 1-242431 | 9/1989 | Japan . |

*Primary Examiner*—Stanley S. Silverman
*Assistant Examiner*—Michael P. Colaianni
*Attorney, Agent, or Firm*—Armstrong, Westerman, Hattorri, McLelnad & Naughton

[57] ABSTRACT

An apparatus for producing an optical fiber porous glass preform using the VAD method which can stably produce a high quality optical fiber porous glass preform, wherein a target bar is only rotatably supported by a chuck and is not pulled upward, a lower tip of a soot body is detected by a laser and a photodetector, and a core burner and a cladding burner is lowered in response to the result detected. A tip position detecting drive and burners are synchronizingly lowered while the deposit of porous glass grows at the lower portion of the target bar.

4 Claims, 1 Drawing Sheet

APPARATUS FOR PRODUCING AN OPTICAL FIBER POROUS GLASS PREFORM

BACKGROUND OF THE INVENTION

1. Field of the Invention

The present invention relates to an apparatus for producing an optical fiber porous glass preform. More specifically, it relates to a technique for realizing stable production of an optical fiber porous glass preform (an optical fiber soot preform) by depositing glass particles generated in a flame by the VAD (vaporized axial deposition type CVD) method on a target (seed bar), for improving the efficiency of production of an optical fiber porous glass preform, and for reducing the height of the apparatus for producing the optical fiber porous glass preform.

2. Description of the Related Art

A variety of optical fibers are known. For example, a single mode optical fiber consists of a core of 10 $\mu$m diameter in the center, a cladding of 125 $\mu$m diameter surrounding the core, and a protective jacket formed by resin covering the cladding.

The method of production of such an optical fiber will be briefly described for background purposes. The main part of the optical fiber, that is, the core and the cladding, is formed by heating and drawing an optical fiber glass preform. The optical fiber glass preform is consequently also comprised of a core part and a cladding part. This optical fiber glass preform itself is formed by converting a soot body for forming the optical fiber porous glass preform into transparent glass.

As typical methods of production of an optical fiber porous glass preform, the OVD method (outer deposition type CVD method) and the VAD method are known. The present invention specifically relates to a method of production of an optical fiber porous glass preform using the VAD method.

Next, the general method of production of an optical fiber porous glass preform using the VAD method will be described.

(1) A seed bar (hereinafter referred to as a "target bar") is first prepared. This target bar is placed inside a reaction container (a reaction chamber) with one end suspended from an upper side so that the target bar can be rotated around its longitudinal center axis.

(2) Oxygen, hydrogen, and other combustion gases and the $SiCl_4$ glass particle material (including a dopant such as $GeCl_4$ if needed) are fed to oxyhydrogen burners from which oxyhydrogen flames are generated. In the oxyhydrogen flames formed by the combustion gases from the burners, the moisture in the oxyhydrogen flames and the $SiCl_4$ undergo a hydrolysis reaction as shown by the following reaction formula and form $SiO_2$, which is the main component of the glass particles.

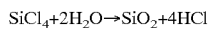

$$SiCl_4 + 2H_2O \rightarrow SiO_2 + 4HCl$$

(3) These glass particles are sprayed to the lower part of the rotating target bar and deposited thereon to form the optical fiber soot body.

As described above, the optical fiber soot body formed by the VAD method is then converted to transparent glass to form the optical fiber porous glass preform used for producing an optical fiber. Note that an optical fiber soot body converted to transparent glass can further have glass particles deposited around it, if necessary. In this case, after depositing the glass particles, the soot body is again converted to transparent glass to form the optical fiber glass preform.

For wide application of the optical fiber produced by the above method, it is desirable that a high quality optical fiber with low transmission loss can be produced and that the optical fiber porous glass preform and, in turn, the optical fiber can be produced efficiently at low cost. A variety of proposals have been made concerning this so far.

In the related art, when synthesizing an optical fiber soot body with a small diameter of about 100 mm using the VAD method, since the burners need only produce a small heating power, there is almost no interference between the core burner and the cladding burner. Further, not enough glass particles are deposited on the inner wall of the reaction chamber to cause any problems.

In recent years, in an attempt to produce an optical fiber effectively at low cost, the optical fiber porous glass preform has been increased in size. Especially, due to the recent advances made in automatic conveyance techniques, the production of a large sized optical fiber porous glass preform of more than 10 kg, which had been difficult to move by hand, has been achieved. To produce an optical fiber soot body with a diameter of more than 200 mm, it is necessary to increase the heating power of the burners and to increase amount of source gases fed to the burners. However, when setting conditions to prevent disturbances in the flow of glass particles toward the optical fiber soot body, there is the disadvantage that glass particles will deposit on the inner wall of the reaction chamber.

Various methods have been proposed to overcome the disadvantage. The following are some known examples of production of a large sized optical fiber soot body.

Japanese Unexamined Patent Publication (Kokai) No. 62-171939 discloses an apparatus for producing an optical fiber porous glass preform (porous optical fiber preform) by the VAD method which eliminates the fluctuations in the flame so as to produce an optical fiber porous glass preform having a predetermined distribution of composition on a target bar (starting bar).

Describing in more detail the apparatus for producing an optical fiber porous glass preform, that is, an optical fiber soot body, disclosed in the above Japanese Unexamined Patent Publication (Kokai) No. 62-171939, this apparatus comprises a reaction chamber, a means connected to the reaction chamber for generating a gas flow inside the reaction chamber, burners, a means for stabilizing the flames of the burners by supplying air or inert gas such as nitrogen gas through a filter provided on the side of the reaction chamber, and a duct provided on the reaction chamber at the side opposite to the filter. The target bar is suspended from the upper side of the reaction chamber and rotated. Glass particles emitted from the burners are deposited on the tip of the lower part of the target bar. That is, the burners are arranged at a lower position in the reaction chamber from where they can eject glass particles to the tip of the lower part of the target bar positioned above the same.

In this apparatus, as the optical fiber soot body grows larger due to the deposition and accumulation of the glass particles on the tip of the lower part of the target bar, the target bar is pulled upward in the reaction chamber. Accordingly, a mechanism which pulls the target bar upward while rotating it is provided at the upper part of the reaction chamber.

However, the apparatus for producing an optical fiber porous glass preform disclosed in the above Japanese Unexamined Patent Publication (Kokai) No. 62-171939 suffers from the following disadvantages:

1. While the intention is to provide a uniform flow of air from a direction perpendicular to the target bar by using the filter and to thereby suppress fluctuation in the flames from the burners to the target bar to stabilize the same, when carrying out experiments with this kind of apparatus, it was found that due in part to the tapered shape of a duct, the glass particles which did not deposit on the target bar ended up adhering to the top surface of the duct resulting in insufficient exhaust. When the air flow through the filter was increased to achieve sufficient exhaust, there was a large fluctuation in the flames.

2. The flows of air in the lateral direction at the upper, center, and lower portions of the reaction chamber end up differing in speed. As a result, it was difficult to obtain stable deposition (growth) of the optical fiber soot body.

3. The reaction chamber of this apparatus was large in structure including, as it did, the part for pulling up the target bar. Along with the deposition of glass particles, the target bar was pulled upward. This structure of a reaction chamber is suitable when the size of the optical fiber soot body is small, however, when pulling up a large optical fiber soot body, it is necessary to provide a chuck with a longer stroke to support the target bar from the top and is necessary to provide a through hole at the upper part of the reaction chamber.

4. Along with the growth of the optical fiber soot body at the upper part of the reaction chamber, the flow of air concentrates at the upper part of the reaction chamber. As a result, the glass particles adhered to the inner wall of the reaction chamber are detached and float freely. Some of the floating glass particles adhere to the optical fiber soot body resulting in air bubbles in the body later on. This may cause a deterioration in the quality of the optical fiber soot body.

Japanese Unexamined Patent Publication (Kokai) No. 1-242431 discloses an apparatus for producing an optical fiber porous glass preform (glass particle deposition apparatus) using the VAD method etc. where a fan is provided to forcibly send air to an exhaust outlet of the reaction chamber surrounding the optical fiber soot body (portion where glass particles are deposited) in order to stabilize the flow of air in the reaction chamber and thereby stabilize the burner flames and the flow of glass particles.

Describing more precisely the above apparatus for producing an optical fiber porous glass preform disclosed in Japanese Unexamined Patent Publication (Kokai) No. 1-242431, the glass source gas is introduced into the oxyhydrogen flames, of a plurality of burners to generate glass particles by the hydrolysis reaction of the flames. These deposit on the target bar to form an optical fiber soot body. The optical fiber soot body is surrounded by the reaction chamber. In other words, a hydrolysis reaction is carried out in the reaction chamber due to the flames. By providing an exhaust outlet on one of the sides of the reaction chamber in the horizontal direction and applying a negative pressure to the exhaust outlet side, the glass particles which did not adhere to the target bar and unreacted gases are exhausted. Furthermore, on the side of the reaction chamber at the opposite side to where the exhaust outlet is provided, that is, on the other side of the reaction chamber, a fan is provided to forcibly send air toward the target bar and the exhaust outlet so as to stabilize the flow of air in the reaction chamber and thereby stabilize the burner flames and the flow of the glass particles. Both the cladding burner and the core burner are provided at the side with the fan. That is, the fan is provided on the same side as the burners.

The target bar is suspended in a direction perpendicular to the burners and the exhaust outlet, that is, vertically, and is rotated about its longitudinal center axis and pulled upward as the glass particles deposit and accumulate at the lower portion of the target bar and the optical fiber soot body grows larger. Accordingly, at the upper part of the reaction chamber, a sleeve portion for accommodating the target bar and the synthesized optical fiber soot body and a mechanism for pulling up the target bar while rotating the same are provided.

However, the apparatus for producing an optical fiber porous glass preform disclosed in Japanese Unexamined Patent Publication (Kokai) No. 1-242431 suffers from the following disadvantages:

1. A larger size of the optical fiber soot body requires larger sizes of the upper sleeve portion and the mechanism for pulling up the target bar. Consequently, the building in which the apparatus for producing the optical fiber porous glass preform is installed has to be larger.

2. Even if a fan is provided, along with formation of the optical fiber soot body, the optical fiber soot body, formed on the target bar by the glass particles deposited thereon, is pulled upward and inserted into the upper sleeve at the upper part of the reaction chamber. Depending on how much is inserted, the flow of air in the reaction chamber changes. As a result, the flow of air cannot be stabilized as much as hoped for. Namely, the target bar is pulled upward so as to keep at a constant position the tip of the target bar where glass particles are deposited from the burner. When the optical fiber soot body is inserted gradually into the upper sleeve portion of the reaction chamber along with its formation, the flow of air in the reaction chamber changes and the position of the flames is lowered. As a result, the speed of growth (speed of formation) in the vertical direction falls and the outer diameter of the optical fiber soot body became larger than desired.

3. To prevent the above problems, it may be considered to cause the production of a forced, downward air flow from the upper sleeve, but this would collide with the rising flow of air naturally generated due to the heat and would cause turbulence, so it would be difficult to stabilize the flow of air in the reaction chamber.

SUMMARY OF THE INVENTION

An object of the present invention is to provide an apparatus for producing an optical fiber porous glass preform which enables stable production of a high quality optical fiber porous glass preform.

Another object of the present invention is to provide an apparatus for producing an optical fiber porous glass preform which realizes a high productivity of an optical fiber porous glass preform.

A still other object of the present invention is to provide an apparatus for producing an optical fiber porous glass which can be reduced in size.

According to the present invention, there is provided an apparatus for producing an optical fiber porous glass preform comprising a reaction chamber for synthesis of the optical fiber porous glass preform, a rotatable supporting means provided at an upper portion of the reaction chamber for rotatably supporting a target bar and an optical fiber soot body deposited at a lower portion of the target bar, a tip position detecting means for detecting a lower tip portion of the optical fiber soot body, burners for forming glass particles in the flames formed from combustion gases, and an elevating means for lowering the burners in position in response to the results of detection of the tip position detecting means.

When the glass particles are being deposited on the target bar to grow the optical fiber soot body, the portion supporting the soot body is not elevated. Instead, the optical fiber porous glass preform is formed by lowering the positions of the tip position detecting apparatus and the burners in synchronization.

Preferably, the burners and the tip position detecting means are integrally affixed to a member which is connected elevatably to the elevating means.

More preferably, the apparatus further includes an exhaust outlet of a length in the vertical direction longer than the length of movement of the burners and of a width narrower enough to obtain more than a predetermined flow rate and a buffer chamber which is longer than the length of the exhaust outlet in the vertical direction placed immediately after the exhaust outlet.

Still more preferably, the apparatus is designed so that the upper end of the exhaust outlet is above the highest parts of the burners.

BRIEF DESCRIPTION OF THE DRAWINGS

The above and other objects and features of the present invention will be clearer from the following description of the preferred embodiments with reference to the accompanying drawings, in which.

DESCRIPTION OF THE PREFERRED EMBODIMENTS

An explanation will be made of an embodiment of an apparatus for the production of an optical fiber porous glass preform according to the present invention with reference to FIGS. 1 and 2.

Figure 1:
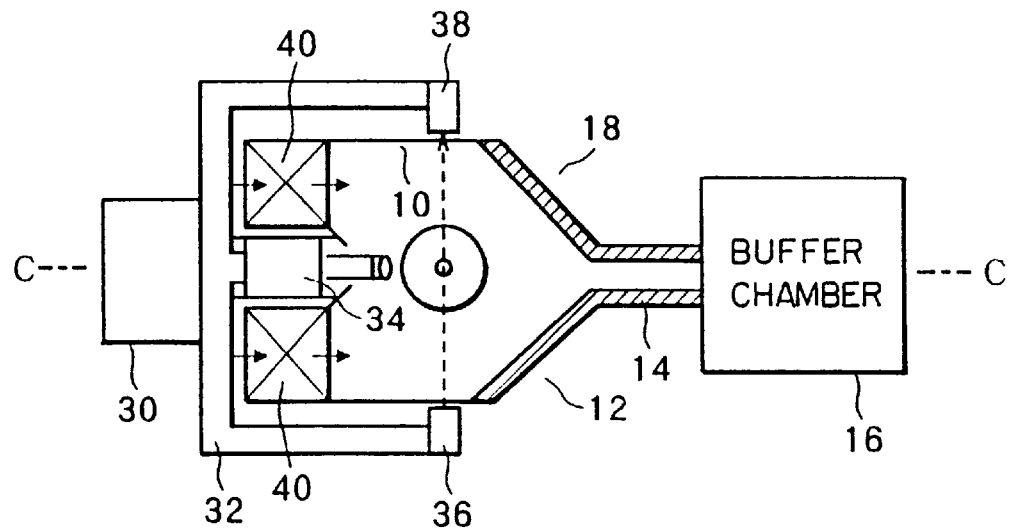
FIG. 1 is a plan view of an embodiment of an apparatus for producing an optical fiber porous glass preform according to the present invention taken along the line H—H of FIG. 2.
Figure 2:
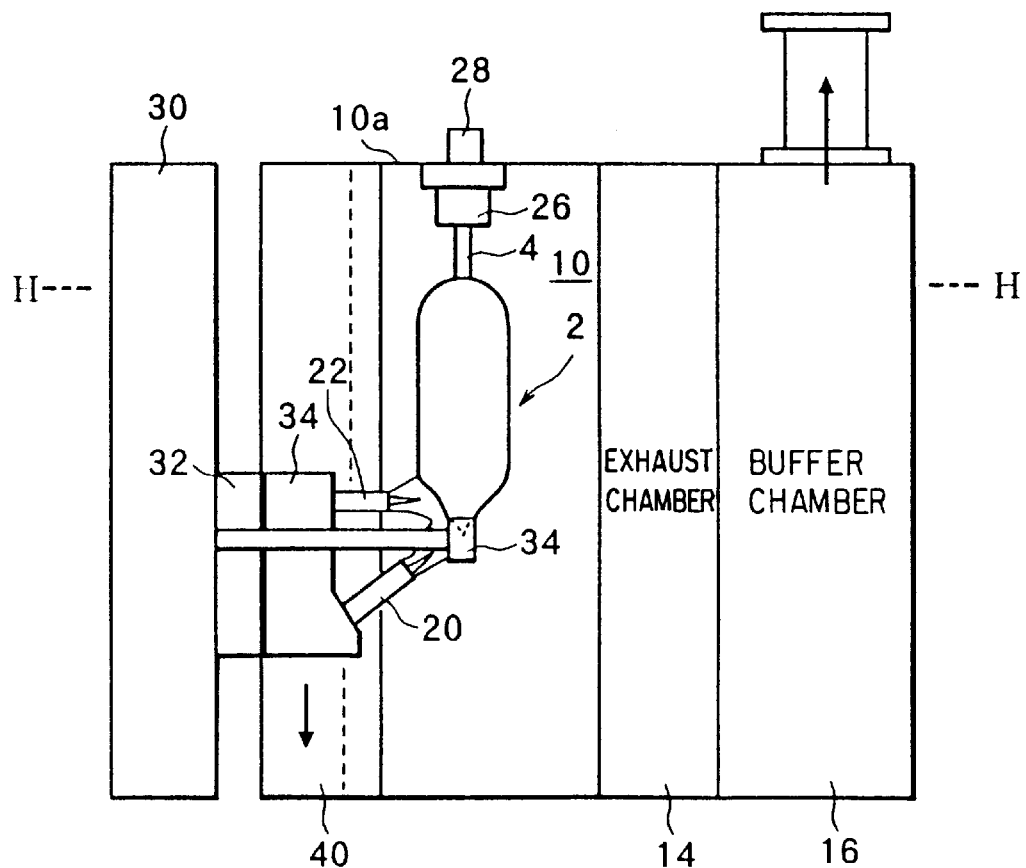
FIG. 2 is a cross-sectional view taken along the line C—C of FIG. 1.

FIG. 1 is a plan view taken along the line H—H of FIG. 2 showing an apparatus for producing an optical fiber porous glass preform, while FIG. 2 is a cross-sectional view taken along the line C—C of FIG. 1.

The apparatus for producing an optical fiber porous glass preform shown in FIGS. 1 and 2 comprises a chamber (reaction container) 10, a duct 12, an exhaust outlet 14, a buffer chamber 16, and a water-cooled jacket 18 provided at the wall of the duct 12 and the exhaust outlet 14.

The apparatus for producing an optical fiber porous glass preform further comprises a chuck 26 provided on the upper side of the chamber 10 for rotatably supporting a target bar (seed bar) 4 which is accommodated in the chamber 10 and a motor 28 mounted on the upper side 10a outside the chamber 10.

The apparatus for producing an optical fiber porous glass preform still further comprises an elevation device 30 mounted outside the chamber 10. A pair of arms 32 is connected to the elevation device 30. The pair of arms 32 move upward and downward along the side walls of the chamber 10 in response to the movement of the elevation device 30. At the center of the pair of arms 32, a burner support 34 is connected. A core burner 20 and a cladding burner 22 are fixed to this burner support 34. The arms 32 extend to the two sides from the chamber 10. A laser 36 and a photodetector 38 are provided at the tips of the arms opposing each other straddling the chamber 10. Therefore, the core burner 20 and the cladding burner 22 are accommodated in the chamber 10, while the laser 36 and the photodetector 38 are placed outside the chamber 10. For the laser 36, for example, a He—Ne laser is used.

On the wall of the chamber 10, an air inlet and a filter 40 are provided.

The chuck 26 fixed to the upper surface 10a of the chamber 10 rotatably suspends an optical fiber soot body 2 comprised of the target bar 4 on which glass particles are deposited. According to the apparatus of the present invention, the optical fiber soot body 2 does not move upward but only rotates. Thus, the apparatus of the present invention is not provided with a mechanism for pulling up the optical fiber soot body 2.

According to the apparatus of the present invention, instead of the target bar 4 being pulled up, the cladding burner 22 and the core burner 20 are moved down along with the formation of the optical fiber soot body 2. Since the optical fiber soot body 2 consists of a core portion at its center and a cladding portion surrounding it, in order to get the glass particles ejected from the core burner 20 to be deposited underneath the glass particles ejected from the cladding burner 22, the core burner 20 is placed lower than the cladding burner 22.

The glass particles ejected from the core burner 20 are ejected toward the lower tip of the optical fiber soot body 2. The lower tip of the optical fiber soot body 2 can be detected by the state of light emitted from the laser 36, passing through the chamber 10, and received by the photodetector 38. That is, the laser 36 and the photodetector 38 function as the means for detecting the tip of the optical fiber soot body 2.

A control device, not shown, receives the signals from the light receiving device 38 and determines the state of formation of the optical fiber soot body 2 from the signals. When determining that the formation has advanced, it drives the elevation device 30 to lower the burner support 34 and therefore the positions of the core burner 20 and the cladding burner 22. Of course, the laser 36 and the photodetector 38 are also lowered along with the burner support 34. Namely, the core burner 20, the cladding burner 22, the laser 36, and photodetector 38 are all affixed to the integrally connected arms 32 and burner support 34, so are all lowered at the same time.

The lengths of the duct 12 and exhaust outlet 14 in the vertical direction are made longer than the length of movement of the burners (core burner 20 and cladding burner 22). The widths are made narrow enough to obtain at least a predetermined flow rate. The buffer chamber 16 is placed immediately behind the exhaust outlet 14 and made longer than the length of the exhaust outlet 14 in the vertical direction. As a result, the optical fiber soot body 2 is constantly surrounded by a uniform air flow and fluctuations in the flames can be eliminated.

The top ends of the air inlet, the filter 40, the duct 12, and the exhaust outlet 14 are higher than the cladding burner 22, that is, higher than the highest placed burner in the reaction chamber, accordingly, the flow of air is not disturbed by the flames of the burners.

The core burner 20 and the cladding burner 22 are used to form the optical fiber soot body 2 on the target bar 4 in the same way as in the related art described in the specification.

That is, while rotating the target bar 4, the lower positioned core burner 20 and cladding burner 22 are fed glass source gases such as $SiCl_4$ and $GeCl_4$, combustion gases such as $O_2$ and $H_2$, and carrier gases such as Ar. The $SiO_2$, GeO$_2$, and other gases formed as a result of the hydrolysis are deposited at the lower part of the target bar 4 thereby forming the optical fiber soot body by the VAD method.

The only difference between the glass particles injected from the core burner 20 and the glass particles injected from the cladding burner 22 is the amount of inclusion of the dopant controlling the refractive index.

During the formation process, the flow of air or nitrogen inside the reaction chamber 10 is controlled to be uniform by the air inlet and the filter 40.

The duct 12 is tapered when seen in the plan direction, connected to the exhaust outlet 14, and further connected to the buffer chamber 16. Namely, while the duct 12 tapers off and is connected to the exhaust outlet 14 the plan direction, they remain the same in area in the longitudinal direction of the optical fiber soot body 2. Accordingly, even when the glass particles in the chamber 10 are carried through the duct 12 and the exhaust outlet 14 to the buffer chamber 16, there is no difference in the flow of air in the longitudinal direction of the optical fiber soot body. As a result, there is no disturbance in the flame from the core burner striking the lower tip of the optical fiber soot body 2. Therefore, according to the present invention, it is possible to produce a uniform and high quality optical fiber porous glass preform.

The height of the chamber 10 is decided according to the length of the optical fiber soot body 2 to be formed. However, unlike the related art, it is not necessary to pull up the soot body 2 into an upper sleeve of the chamber 10, therefore the height of the chamber 10 can be reduced.

Since no mechanism for pulling up the optical fiber soot body 2 has to be provided at the upper portion of the chamber 10, it is easier to produce a heavy optical fiber porous glass preform.

EXPERIMENT EXAMPLES

The result of actual production of soot bodies 2 using the apparatus shown in the figures will be described next.

As an apparatus for producing an optical fiber porous glass preform, a system which maintains an exhaust of 10 m$^3$/minute was prepared.

The jack 26 of the apparatus supported a target bar 4 to ready it for formation of the soot body.

While rotating the target bar 4 by the motor 28, predetermined amounts of source gases (SiCl$_4$ and GeCl$_4$), combustion gases (O$_2$ and H$_2$), and a carrier gas (Ar) were supplied to the core burner 20 and cladding burner 22 below the target bar 4 in the chamber 10. The resultant hydrolysis reaction created SiO$_2$ and GeO$_2$ which were then deposited on the lower part of the target bar 4.

The state of formation of the optical fiber soot body 2 was detected by the laser 36 and the photodetector 38. The elevation device 30 was controlled based on this to lower the positions of the core burner 20 and the cladding burner 22.

As a result, production of a high quality optical fiber soot body 2 is realized.

In the next experiment, the amounts of the glass particle source gases and combustion gases supplied to the core burner 20 were doubled in amount. Despite this, almost no adherence of glass particles inside the duct 12 and exhaust outlet 14 was observed.

Next, the heating powers of the burners and the amounts of the glass particle source gases and combustion gases were increased to produce an optical fiber soot body having a diameter of more than 200 mm. An optical fiber soot body 2 was able to be formed without glass particles adhering to the inner wall of the chamber 10, the duct 12, and the exhaust outlet 14. To put it other way, it was possible to form an air flow not causing glass particles to adhering to the inner wall of the reaction chamber 10, the duct 12, and the exhaust outlet 14.

Next, the lengths of the air inlet and the filter 40 in the vertical direction were made longer than the length of movement of the burners by the elevation device 30, while the widths were reduced to obtain more than the predetermined flow rate, for example, more than 10 m$^3$/minute. The buffer chamber 16 was provided behind the exhaust outlet 14 with a longer length than the length of the exhaust outlet 14 in the vertical direction. As a result, the flow of gas in the chamber 10 became uniform, and smooth composing of glass particles was attained.

That is, according to the embodiments of the present invention, even when the optical fiber soot body 2 grows, no free floating of glass particles removed from the inner walls of the chamber 10 caused by the flow of air concentrating at the upper portion of the chamber 10 is observed. Therefore, it is possible to prevent the problem of glass particles floating in the air adhering onto the optical fiber soot body 2 and causing later bubbles.

According to the embodiments of the present invention, since the core burner 20 and the cladding burner 22 are lowered through the walls of the chamber 10, it is necessary to make the walls of the chamber 10 airtight and to maintain the chamber airtight, but unlike the related art, there is no need to provide a through hole at the upper surface of the chamber 10 for pulling up the optical fiber soot body 2.

Note that the present invention can be modified in various ways within the scope of the above-mentioned embodiments.

For example, the means for detecting the lower tip of the optical fiber soot body 2 is not limited to the laser 36 and the photodetector 38. It is possible to use a CCD camera etc. to photograph the lower tip of the optical fiber soot body 2 and process the resultant image to determine the degree of formation of the optical fiber soot body 2. A variety of other non-contact detecting means can be used for detecting the degree of formation of the optical fiber soot body 2.

Since the inside of the chamber 10 becomes high in temperature, mention was made of examples with the laser 36, photodetector 38, and CCD camera placed outside the chamber 10, however heat resistant detecting means can be placed inside the chamber 10.

According to the apparatus for producing an optical fiber porous glass preform of the present invention, it is possible to consistently produce a high quality optical fiber porous glass preform.

Furthermore, according to the present invention, it is possible to produce an optical fiber porous glass preform with a high productivity.

Also, an apparatus for producing an optical fiber porous glass preform of the present invention can be made small in size.

What is claimed is:

1. An apparatus for producing an optical fiber porous glass preform, comprising:
   a reaction chamber for synthesis of the optical fiber porous glass preform;
   a rotatable supporting means provided at an upper portion of the reaction chamber for rotatably supporting a vertical target bar and an optical fiber soot body deposited at a lower portion of the vertical target bar;

tip position detecting means for detecting a lower tip portion of the optical fiber soot body;

burners for forming glass particles in the flames formed from combustion gases; and an elevating means for lowering the burners in position in response to the results of detection of the tip position detecting means.

2. An apparatus for producing an optical fiber porous glass preform as set forth in claim 1, wherein the burners and the tip position detecting means are integrally affixed to a member which is connected elevatably to the elevating means.

3. An apparatus for producing an optical fiber porous glass preform as set forth in claim 1, further comprising an exhaust outlet of a length in the vertical direction longer than the length of movement of the burners and of a width narrower enough to obtain more than a predetermined flow rate and a buffer chamber which is longer than the length of the exhaust outlet in the vertical direction placed immediately after the exhaust outlet.

4. An apparatus for producing an optical fiber porous glass preform as set forth in claim 3, wherein the upper end of the exhaust outlet is above the highest parts of the burners.

* * * * *